United States Patent
Lundén et al.

(10) Patent No.: US 12,022,311 B2
(45) Date of Patent: Jun. 25, 2024

(54) EVALUATING EFFECT OF A CHANGE MADE IN A COMMUNICATION NETWORK

(71) Applicant: Elisa Oyj, Helsinki (FI)

(72) Inventors: Petteri Lundén, Helsinki (FI); Adriana Chis, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/043,745

(22) PCT Filed: Aug. 23, 2021

(86) PCT No.: PCT/FI2021/050567
§ 371 (c)(1),
(2) Date: Mar. 2, 2023

(87) PCT Pub. No.: WO2022/053739
PCT Pub. Date: Mar. 17, 2022

(65) Prior Publication Data
US 2023/0262496 A1   Aug. 17, 2023

(30) Foreign Application Priority Data
Sep. 9, 2020 (FI) .................................. 20205872

(51) Int. Cl.
*H04W 24/08* (2009.01)
*H04L 41/142* (2022.01)

(52) U.S. Cl.
CPC ........... *H04W 24/08* (2013.01); *H04L 41/142* (2013.01)

(58) Field of Classification Search
None
See application file for complete search history.

(56) References Cited

U.S. PATENT DOCUMENTS

| | | |
|---|---|---|
| 2015/0296395 A1 | 10/2015 | Vaderna et al. |
| 2016/0135067 A1 | 5/2016 | Morad et al. |
| 2017/0265089 A1 | 9/2017 | Sanneck et al. |

(Continued)

FOREIGN PATENT DOCUMENTS

| | | |
|---|---|---|
| EP | 1585357 A1 | 10/2005 |
| EP | 3298817 B1 | 12/2018 |
| WO | 2009046776 A1 | 4/2009 |

(Continued)

OTHER PUBLICATIONS

Torday et al., "Why control an experiment?" posted at <https://www.ncbi.nlm.nih.gov/pmc/articles/PMC6776925/> on Sep. 3, 2019. (Year: 2019).*

(Continued)

*Primary Examiner* — Scott B Christensen
(74) *Attorney, Agent, or Firm* — Ziegler IP Law Group (57) ABSTRACT

A computer implemented method for evaluating effect of a change made in a communication network. The method is performed by comparing values of the performance indicator in a cell of interest before and after the change to obtain a first comparison result; comparing values of the performance indicator in a set of reference cells before and after the change to obtain a second comparison result; and evaluating the effect of the change made in the communication network based on difference between the first comparison result and the second comparison result.

15 Claims, 7 Drawing Sheets

(56) References Cited

U.S. PATENT DOCUMENTS

2018/0184344 A1* 6/2018 Periyasamy .......... H04W 36/32
2020/0059815 A1 2/2020 Nuss et al.

FOREIGN PATENT DOCUMENTS

WO 2015027726 A1 3/2015
WO 2018162046 A1 9/2018
WO 2020088734 A1 5/2020

OTHER PUBLICATIONS

European Patent Office, Notification of Transmittal of the International Search Report and the Written Opinion of the International Searching Authority, or the Declaration, PCT/FI2021/050567, mailed Nov. 18, 2021, 14 pages.
Finnish Patent and Registration Office, Search Report, U.S. Appl. No. 20/205,872, dated Apr. 6, 2021, 2 pages.

* cited by examiner

301. Start comparison of performance indicator values before and after the change 302. Perform comparison for a cell of interest to obtain first comparison result 303. Select a set of reference cells 304. Perform comparison for the set of reference cells to obtain second comparison result 305. Evaluate effect of the change based on difference between the first comparison result and the second comparison result 306. Keep or revert the change based on the evaluation result

Fig. 3

401. Parameter change in cell A at time T

402. Calculate relative KPI change in cell A △A

403. Select N reference cells

404. Calculate combined KPI for the reference cells

405. Calculate relative KPI change in reference cells △N

406. Compare △A and △N

407. If comparison indicates no improvement, revert the parameter change

408. If comparison indicates improvement, keep the parameter change and calculate adjusted improvement factor

EVALUATING EFFECT OF A CHANGE MADE IN A COMMUNICATION NETWORK

TECHNICAL FIELD

The present application generally relates to automated evaluation of effects of changes, such as parameter changes or other changes, made in cellular communication networks.

BACKGROUND

This section illustrates useful background information without admission of any technique described herein representative of the state of the art.

Cellular communication networks comprise a plurality of cells serving users of the network. When users of the communication network move in the area of the network, connections of the users are seamlessly handed over between cells of the network. In order to provide good quality of service for users of the network, different parts of the network need to operate as intended.

There are various network parameters that affect operation of individual cells of the network and/or the network in larger scale. For example, due to network topology and usage of the network evolving or for other reasons there is constant need to change (values of) various parameters or to make other changes to optimize operation of the cells of the network. Such parameters that are changed comprise for example antenna tilt, transmission power, handover parameters and plurality of other parameters.

Impact of a parameter change may be evaluated by comparing performance indicators before and after the change. A challenge in such comparison is that there are other factors that affect the performance, too. If the time period over which the evaluation is done is long, the performance indicators may include seasonal effects of long-term changes. Shorter time periods, on the other hand, make analysis more difficult as it is more difficult to average out noise due to inherent uncertainty in network load, traffic patterns, weather conditions etc.

Now there is provided a new method of monitoring impact of parameter changes.

SUMMARY

The appended claims define the scope of protection. Any examples and technical descriptions of apparatuses, products and/or methods in the description and/or drawings not covered by the claims are presented not as embodiments but as background art or examples useful for understanding the aspects of the disclosed embodiments.

According to a first example aspect there is provided a computer implemented method for evaluating effect of a change made in a communication network. The method comprises comparing values of a performance indicator before and after the change to evaluate the effect of the change made in the communication network, comparing values of the performance indicator in a cell of interest before and after the change to obtain a first comparison result;

comparing values of the performance indicator in a set of reference cells before and after the change to obtain a second comparison result; and evaluating the effect of the change made in the communication network based on difference between the first comparison result and the second comparison result.

In some example embodiments, such reference cells are selected that exhibit similar behaviour with the cell of interest but that are not substantially affected by the change made in the communication network. In some example embodiments, the set of reference cells is selected based on one or more of the following: distance to the cell of interest, cell type, and historical behaviour of performance indicators.

In some example embodiments, the set of reference cells is selected based on distance to the cell of interest and cell type.

In some example embodiments, the set of reference cells is selected based on distance to the cell of interest, cell type, and historical behaviour of performance indicators.

In some example embodiments, the historical behaviour of performance indicators comprises information about correlation of historical behaviour between the cell of interest and the reference cells.

In some example embodiments, the method further comprises excluding from the set of reference cells at least one cell that is directly affected by the change made in the communication network.

In some example embodiments, the first and second comparison results are relative differences in the values of the performance indicator.

In some example embodiments, the evaluation of the effect of the change made in the communication network is performed by subtracting the second comparison result from the first comparison result or by dividing the first comparison result by the second comparison result.

In some example embodiments, the second comparison result comprises a distribution of individual cell comparisons and the evaluation of the effect of the change made in the communication network is performed based on comparing the first comparison result to the distribution of individual cell comparisons.

In some example embodiments, the evaluation of the effect of the change made in the communication network depends on the percentile of values to which the first comparison result belongs in the distribution of individual cell comparisons.

In some example embodiments, the method further comprises comparing values of more than one performance indicator; and performing the evaluation of the effect of the change made in the communication network based on comparison results obtained by comparing values of more than one performance indicator.

In some example embodiments, the change made in the communication network is a network parameter change in the cell of interest or in a sector of interest or in a base station site of interest.

In some example embodiments, the change made in the communication network is related to one or more of power save, performance optimization, increasing capacity, load balancing and solving a performance problem.

In some example embodiments, the method further comprises, responsive to the result of the evaluation of the change made in the communication network, keeping the change or reverting the change.

According to a second example aspect of the disclosed embodiments, there is provided an apparatus comprising a processor and a memory including computer program code; the memory and the computer program code configured to, with the processor, cause the apparatus to perform the method of the first aspect or any related embodiment.

According to a third example aspect of the present disclosed embodiments, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

Example embodiments described in the present disclosure and potential advantages are understood by referring to FIGS. 1 through 6C of the drawings. In the following description, like reference signs denote like elements or steps.

Example embodiments described herein provide evaluation of effects of a change made in a communication network for the purpose of controlling the communication network. Based on the evaluation, it is decided whether to keep the change or to revert the change. The change may be a network parameter change or some other change in a cell, sector or base station site. The parameter that is changed may be for example antenna tilt, transmission power, handover parameter or some other parameter that may be adjusted in a communication network.

Figure 1:
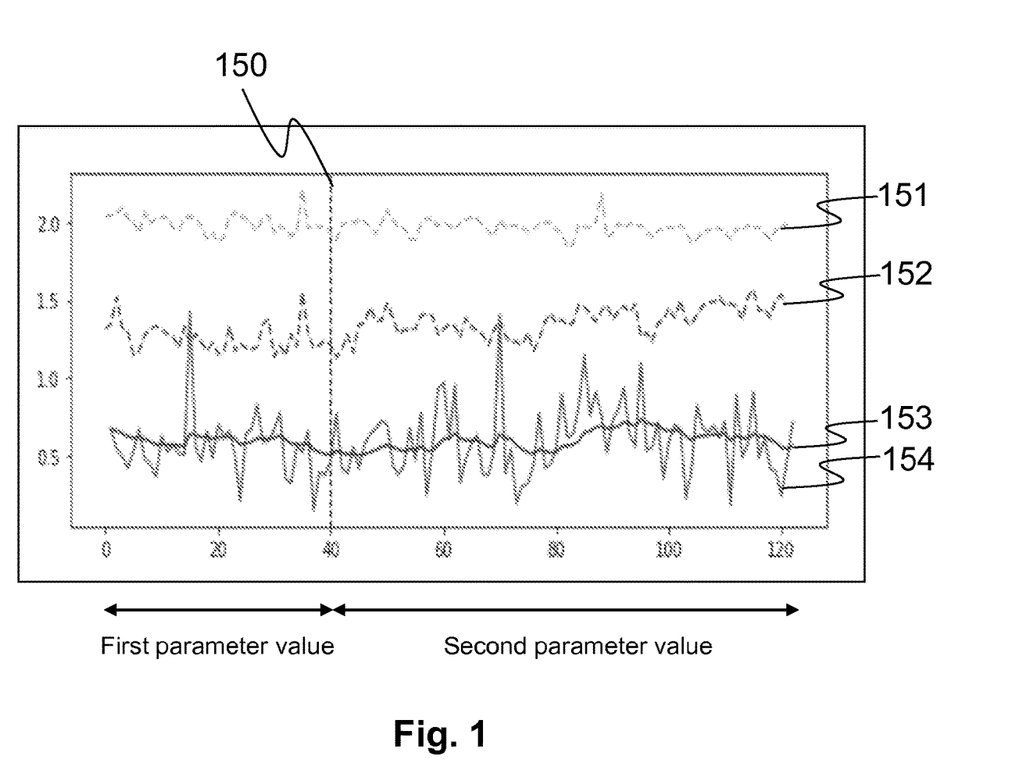
FIG. 1 is a graph showing performance before and after a parameter change.

FIG. 1 is a graph showing performance before and after a parameter change. The graph shows 4 different performance indicator values 151-154 as a function of time. The performance indicators may relate to spectral efficiency, signal level, throughput, number of dropped calls or other performance indicators available in a communication network. Line 150 indicates point of time when a parameter value is changed. Before the point of time 150, a first value is used and after the point of time 150 a second value is used. It can be clearly seen that comparing any one of the performance indicators before and after the point of time 150 is not straightforward as there is no clearly visible difference in the performance graphs.

Based on this, evaluation of effects of a change by comparing of performance before and after the change is not a straightforward task.

Figure 2A:
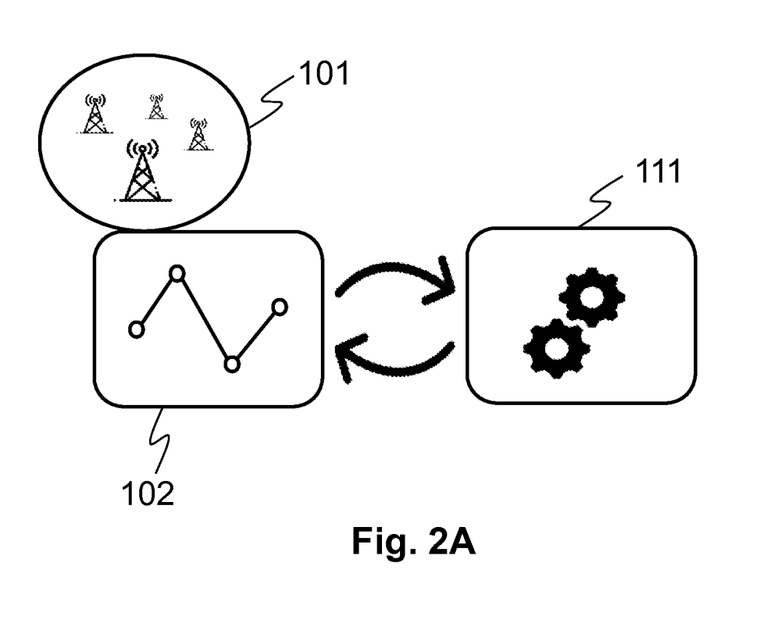
FIG. 2A schematically shows an example scenario according to an example embodiment.

FIG. 2A schematically shows an example scenario according to an embodiment. The scenario shows a communication network 101 comprising a plurality of cells and base stations and other network devices, and an operations support system, OSS, 102 configured to manage operations of the communication network 101. Further, the scenario shows an automation system 111. The automation system 111 is configured to implement automated monitoring of operation of the communication network 101. The automation system 111 is operable to interact with the OSS 102 for example to receive performance data from the OSS 102 and to provide modified or new parameter values and configurations to the OSS 102 for use in the communication network 101.

The automation system 111 is configured to implement at least some example embodiments of present disclosure.

In an embodiment the scenario of FIG. 2A operates as follows: The automation system 111 receives performance data comprising values of performance indicators from the OSS 102. The automation system gathers the performance data associated with a first time period before a change is implemented in the communication network and with a second time period after the change. The change may comprise changing one or more parameter values, modifying configuration and/or making changes in network equipment (such as upgrading hardware or software, or adding new capacity by deploying new cells).

The performance data is automatically analysed in the automation system 111 to evaluate effects of the change made in the communication network. The results of the analysis may be provided for further automated processes running in the automation system 111 or shown on a display or otherwise output to a user.

The analysis may be automatically or manually triggered. The analysis may be performed in association with all changes implemented in the communication network or in association with some selected changes.

Figure 2B:
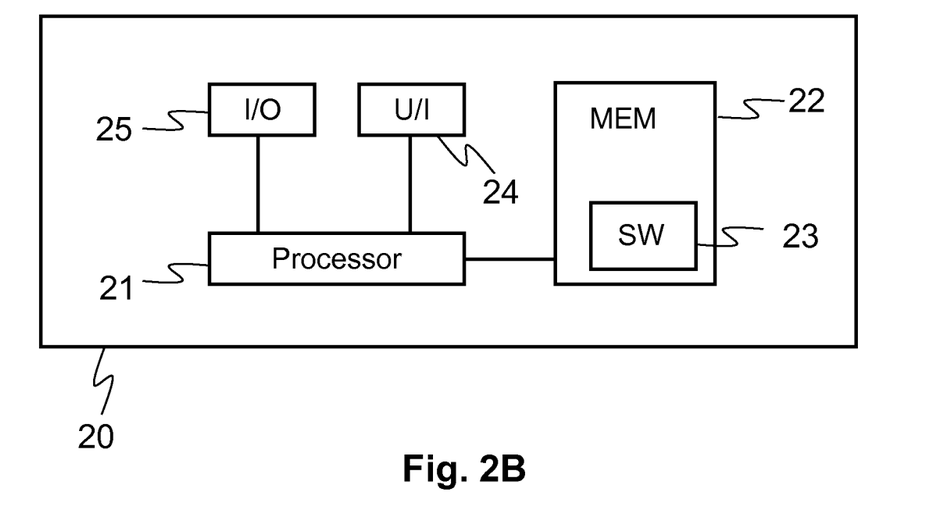
FIG. 2B shows a block diagram of an apparatus according to an example embodiment.

FIG. 2B shows a block diagram of an apparatus 20 according to an embodiment. The apparatus 20 is for example a general-purpose computer or server or some other electronic data processing apparatus. The apparatus 20 can be used for implementing at least some embodiments described herein. That is, with suitable configuration the apparatus 20 is suited for operating for example as the automation system 111 of foregoing disclosure.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2B, but the aspects of the disclosed embodiments may equally be implemented in a cluster of shown apparatuses.

Figure 3:
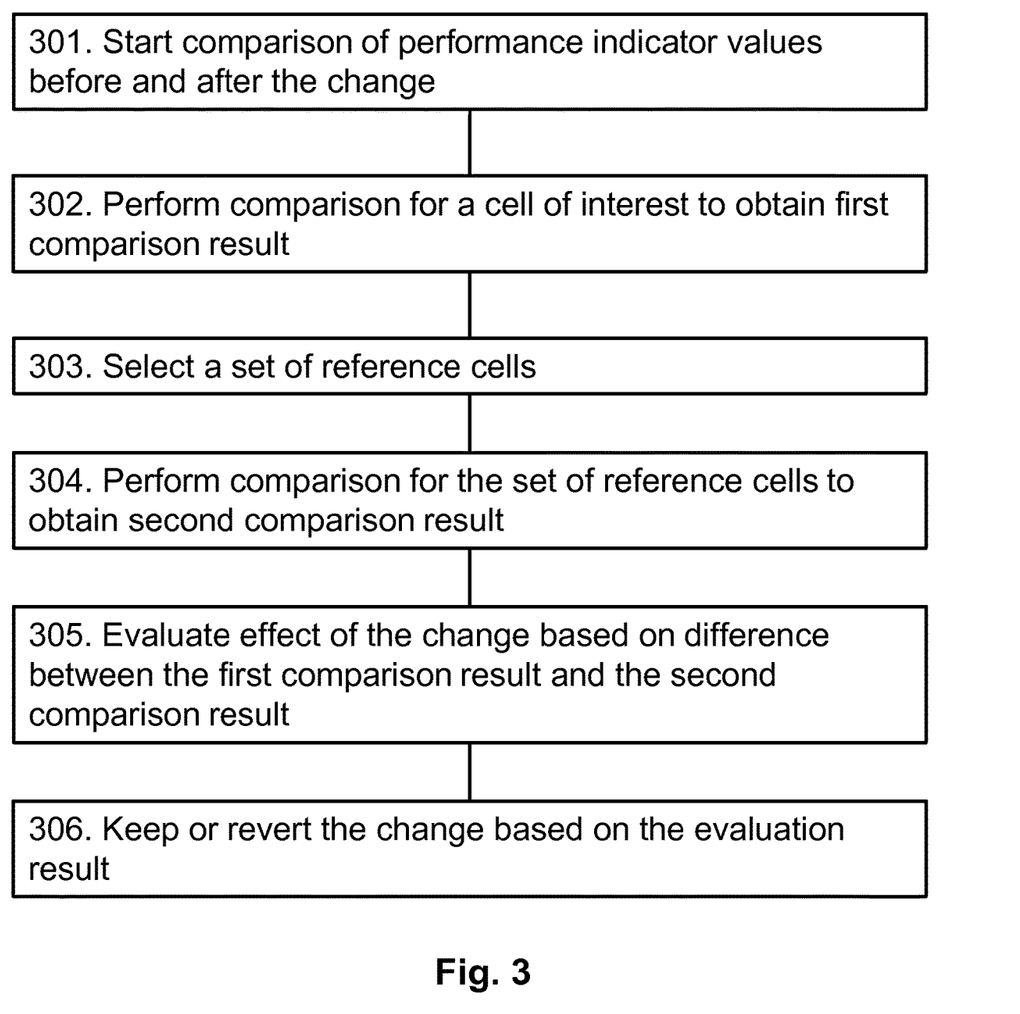
FIGS. 3-4 show flow diagrams illustrating example methods according to certain embodiments.
Figure 4:
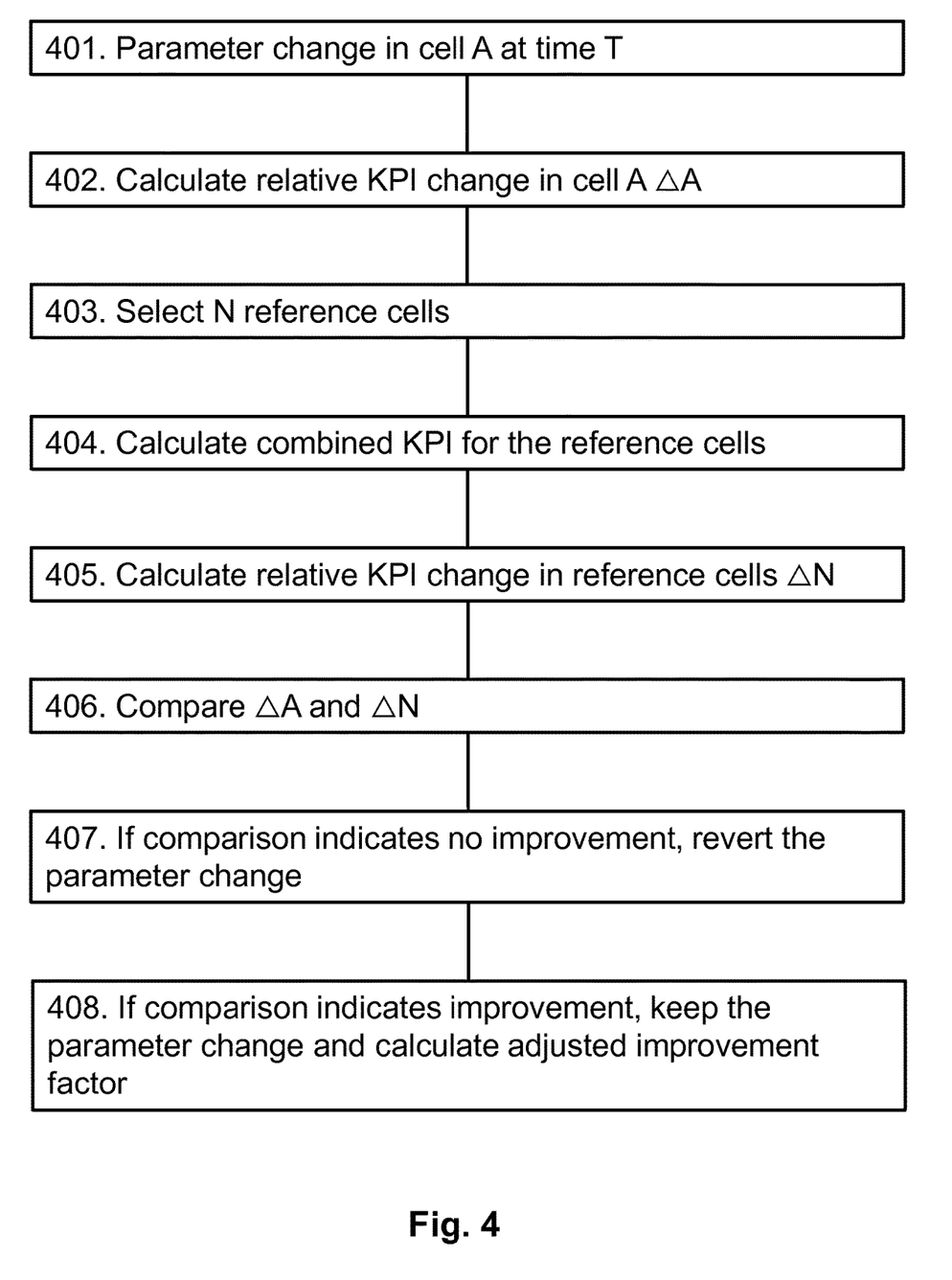

FIGS. 3-4 show flow diagrams illustrating example methods according to certain embodiments. The methods may be implemented in the automation system 111 of FIG. 2A and/or in the apparatus 20 of FIG. 2B. The methods are implemented in a computer and do not require human interaction unless otherwise expressly stated. It is to be noted that the methods may however provide output that may be further processed by humans and/or the methods may require user input to start. Different phases shown in the flow diagrams may be combined with each other and the order of phases may be changed except where otherwise explicitly defined. Furthermore, it is to be noted that performing all phases of the flow diagrams is not mandatory.

The methods of FIGS. 3-4 provide evaluating effects of a change made in a communication network. In an embodiment the change made in the communication network is a network parameter change in a cell of interest or in a sector of interest or in a base station site of interest. Additionally or alternatively, the change may be related to one or more of power/energy save, performance optimization, increasing capacity, load balancing and solving a performance problem. The change may be for example a change in power/energy saving schedule, tilt angle, handover parameter, load balancer or some other configuration parameter of the communication network.

The method of FIG. 3 comprises the following phases:

301: Comparison of values of a performance indicator before and after the change is started for the purpose of evaluating the effect of the change. There is for example a first set of performance indicator values measured over a first period of time before the change is made in the communication network and a second set of performance indicator values measured over a second period of time after the change is made in the communication network.

The first and second set of performance indicator values may be received e.g. from OSS of the communication network or from other source. All values may be received concurrently or the values may be received in smaller sets. The performance indicator values may relate to number of users, throughput, SINR values, RSRP values, signal strengths and other performance indicators available in communication networks. The performance indicator values may be referred to as Key Performance Indicators, KPI. More than one performance indicator type may be taken into account.

The performance indicator values may provide absolute values or they may be bin structured. It is possible that only part of the received performance indicator values are analysed, or that the received values are analysed in parts for evaluating different effects. The analysis may be directed to certain percentile, such as for example $10^{th}$, $50^{th}$ or $90^{th}$ percentile.

The first and second time periods may be equally long or their lengths may differ from each other. In an embodiment, the first and second time periods are multiples of 24 hour time periods. By using a 24 hour time period or multiples thereof, one achieves that hourly variation in network usage is covered. In an embodiment, the first and second time periods are 1-3 weeks. By using a longer time period daily or even weekly variation of network usage is covered. It is to be noted that even longer time periods may be used.

302: Comparison of values of the performance indicator before and after the change is performed for a cell of interest to obtain a first comparison result.

303: A set of reference cells is selected. The aim is to select such reference cells that exhibit similar behaviour with the cell of interest, but that are not (significantly) affected by the change made in the communication network. The selection of such reference cells can be based on using distance to the cell of interest for excluding cells that are near the cell of interest and thus affected by the change. Additionally of alternatively, the selection of such reference cells can be based on using cell type to finding and selecting cells of same type, the same cell type being considered to indicate similar behaviour. Additionally of alternatively, the selection of such reference cells can be based on using historical behaviour of performance indicators in the cell of interest and other cells for finding and selecting cells that exhibit substantially similar performance, the similar performance being considered to indicate similar behaviour.

That is, one or more of the following may be used as basis for selection of the reference cells: distance to the cell of interest, cell type, and historical behaviour of performance indicators. In an embodiment a combination of the distance to the cell of interest and cell type is used. In another embodiment, all three of the distance to the cell of interest, cell type, and historical behaviour of performance indicators are used. By using all three of the distance to the cell of interest, cell type, and historical behaviour of performance indicators, one may achieve more precise selection of reference cells that exhibit similar behaviour with the cell of interest. In an embodiment certain cells are excluded from being reference cells. For example adjacent cells or cells that are directly affected by the change made in the communication network may be excluded.

In an example embodiment, the distance to the cell of interest is used for selecting reference cells located in the same geographic area with the cell of interest or in proximity of the cell of interest. Such cells are considered to exhibit similar behaviour. For example, cells within n times cell range (e.g. 3 times cell range) of the cell of interest may be selected as reference cells, or certain number (e.g. 100) of closest cells may be selected as reference cells. Besides direct geographical distance, other distance metrics could be used, e.g. taking into account relative antenna bearings and sector widths of the respective cells. In an example embodiment, the cell type is used for selecting reference cells that are similar to the cell of interest for example based on cell size, antenna height, antenna type, sector width, tilt angle, data volume, user density, operating frequency etc. For example, cells that are of similar size with the cell of interest or cells that operate of same frequency band with the cell of interest may be selected as reference cells. In an example embodiment, historical behaviour of performance indicators is used for selecting reference cells that have historical correlation in performance indicators with the cell of interest before the change (e.g. similar seasonality and/or trend patterns in the past). I.e. such reference cells are selected that have had similar performance behaviour with the cell of interest.

In yet another embodiment, reference cells that are considered most similar to the cell of interest may be given more weight than other reference cells, so that they have more relevance in the ensuing comparison in phases 304-305.

304: Comparison of values of the performance indicator before and after the change is performed for the set of reference cells to obtain a second comparison result.

When bin structured performance indicator values are compared in phase 302 or 304, the comparison may concern comparison of distribution of values in the bins.

305: The effect of the change made in the communication network is evaluated based on difference between the first comparison result and the second comparison result.

In an example embodiment, the first and second comparison results are relative differences in the values of the performance indicator. Alternatively the comparison results may be absolute values.

The evaluation of the effect of the change made in the communication network can be performed by suitable mathematical calculation such as subtraction or division. The second comparison result can be subtracted from the first comparison result or the first comparison result can be divided by the second comparison result.

Additionally or alternatively, the evaluation of the effect of the change made in the communication network may be performed based on absolute or relative values of the first comparison result and the second comparison result in combination with distribution of values of the first comparison result and the second comparison result.

306: Based on the evaluation result the change is kept or reverted. More specifically, if the evaluation indicates larger improvement in performance of the cell of interest compared to performance improvement of the reference cells, the change is kept and possibly also a new change in same direction may be made. If the evaluation indicates degradation or smaller improvement in performance of the cell of interest compared to performance improvement of the reference cells, the change may be reverted or other corrective action could be taken to address the performance problem.

For example, if the first comparison result indicates performance improvement x and second comparison result indicates performance improvement y, and x is larger than y, then there is larger improvement in performance of the cell of interest compared to performance improvement of the reference cells and the change can be kept. If x is smaller than y, then there is smaller improvement in performance of the cell of interest compared to performance improvement of the reference cells and the change can be reverted. Corresponding logic applies with degradation in performance.

It is to be noted that the second comparison result is computed for a set of cells, so it can be considered as a distribution of individual cell comparisons or it could be aggregated to e.g. just a mean value.

In an embodiment, the second comparison result may comprise individual comparison result for a plurality of reference cells. In such case, the evaluation phase 305 may comprise individually evaluating difference between the first comparison result and each instance of the second comparison result and the results of these evaluations may be combined to produce complete evaluation result. In an alternative, the evaluation can be performed based on distribution of the plurality of values of the second comparison results. The first comparison result may be compared to the distribution of the individual reference cell comparison results of the second comparison result. The result of the evaluation phase 305 may depend on the percentile of values in the distribution of the second comparison result to which the first comparison result belongs. Still alternatively, the plurality of instances of the second comparison result may be aggregated to a single value for the evaluation phase 305. The aggregation may be done e.g. by calculating mean of the values.

Alternatively, the second comparison result may be based on aggregated performance indicator values from a plurality of reference cells. I.e. the plurality of performance indicator values are aggregated before the comparison of performance before and after the change. E.g. mean of the performance indicator values from the plurality of reference cells can be used for aggregating the performance indicator values. In this way, the second comparison result comprises only one result that can be easily compared with the first comparison result.

Further, it is to be noted that method of FIG. 3 discusses processing of one performance indicator. However, more than one performance indicator may be handled accordingly and the evaluation result may be based on combination of evaluation results of more than one performance indicator. In such case, more important performance indicators may be given more weight than less important performance indicators.

FIG. 4 provides more detailed discussion on certain example implementation on some aspects of the more generic method of FIG. 3. The method of FIG. 4 comprises the following phases:

401: A parameter change is performed in cell A at time T.
402: Relative KPI change in cell A is calculated as $$\Delta A = \frac{KPI_A^{After\ T}}{KPI_A^{Before\ T}}$$

where $KPI_A^{AfterT}$ is mean KPI over a time period after the change, and
$KPI_A^{BeforeT}$ is mean KPI over a time period before the change.

403: N reference cells are selected.

404: Combined KPI for the reference cells is calculated as $$KPI_N = \frac{1}{N}\sum_{i=1}^{N} KPI_i$$

405: Relative KPI change in reference cells is calculated as $$\Delta N = \frac{KPI_N^{AfterT}}{KPI_N^{BeforeT}}$$

where $KPI_N^{AfterT}$ is mean KPI over a time period after the change, and
$KPI_N^{BeforeT}$ is mean KPI over a time period before the change.

406: ΔA and ΔN are compared.

407: If comparison of phase 406 indicates no improvement in cell A, the parameter change is reverted.

408: If comparison of phase 406 indicates improvement in cell A, the parameter change is kept. Also an adjusted improvement factor can be calculated as $$\Delta\hat{A} = \frac{\Delta A}{\Delta N}$$

By calculating the adjusted improvement factor ΔÂ, a numerical value can be obtained for the amount of improvement achieved. In this way effects of different changes can be compared with each other. The computation effectively applies a baseline (or reference level) for the performance change based on what happens in cells that are considered comparable to cell A.

Figure 5A:
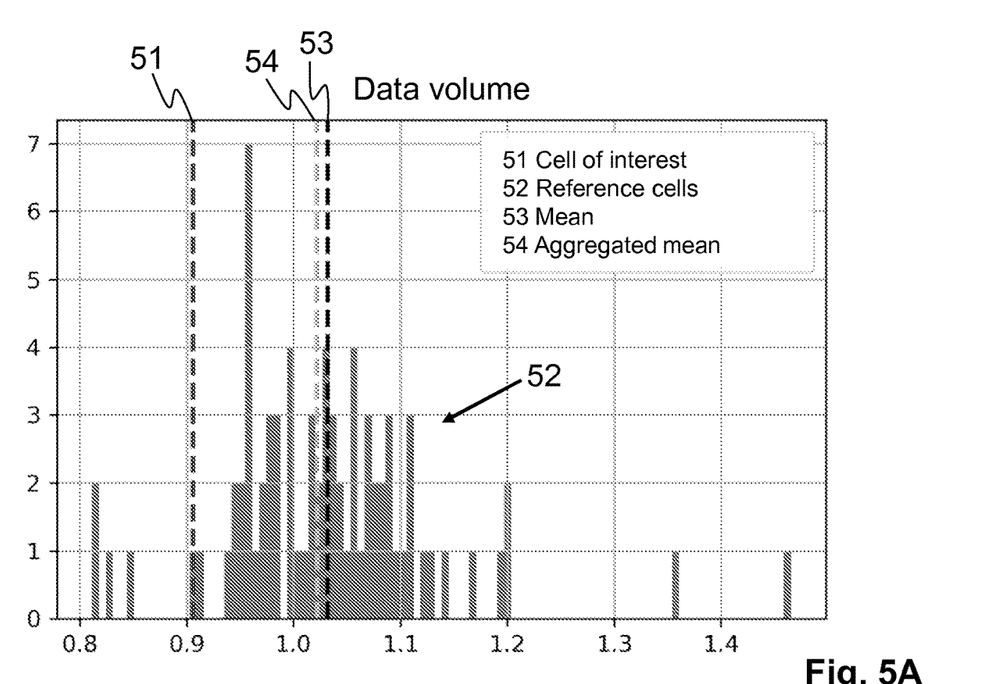
FIGS. 5A-5C show graphs illustrating an example case with performance improvement.
Figure 5B:
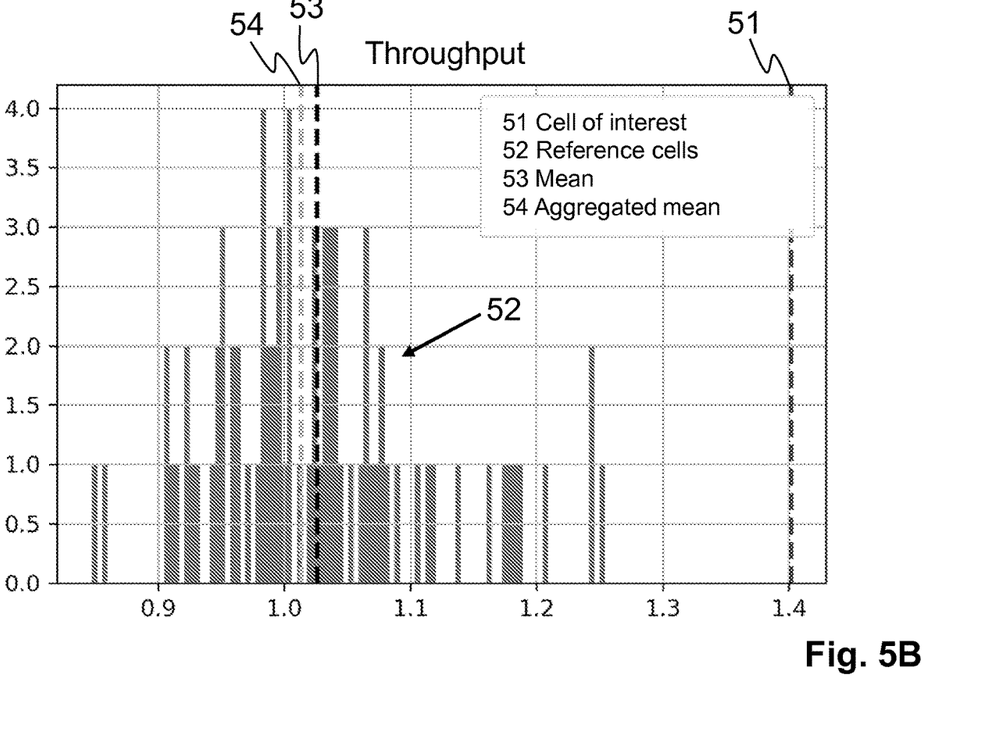
Figure 5C:
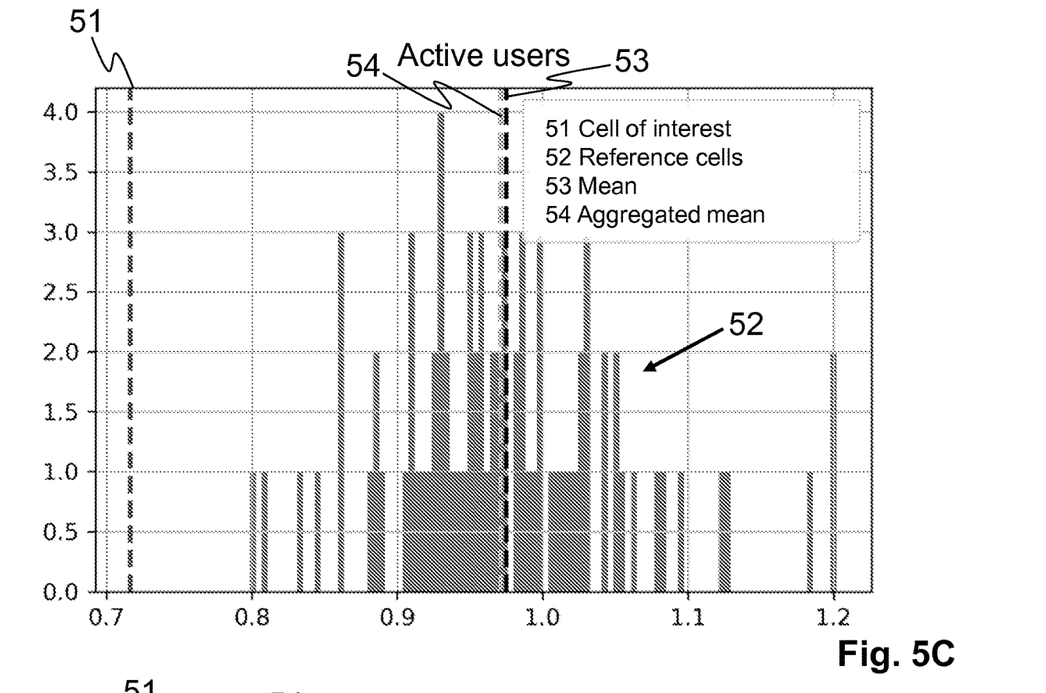
Figure 6A:
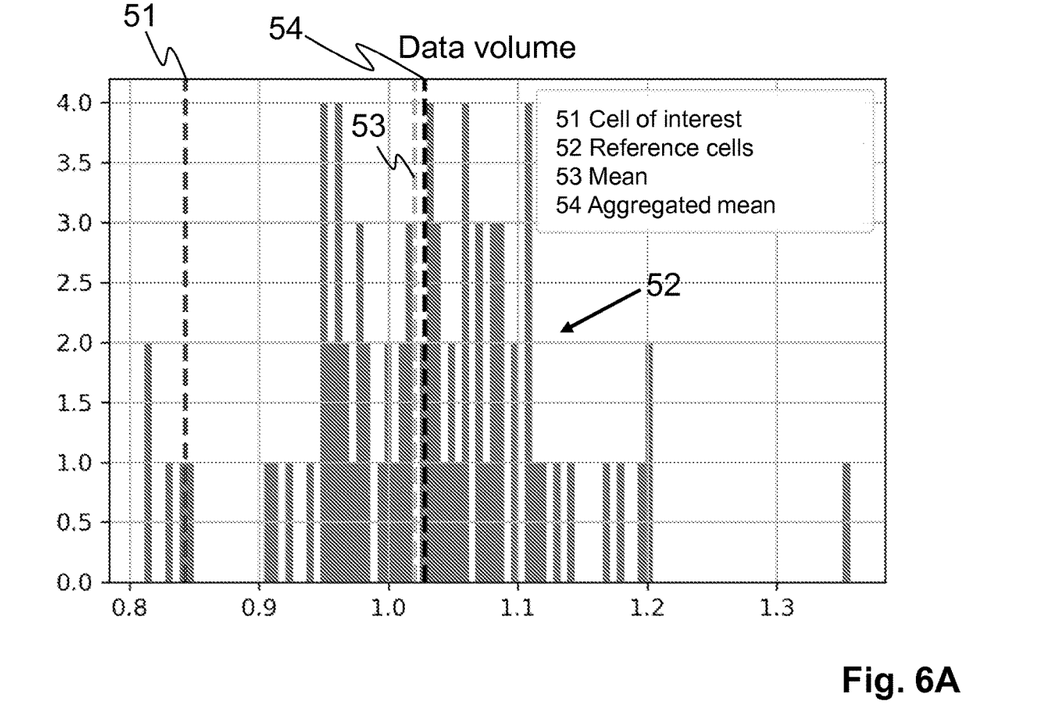
FIGS. 6A-6C show graphs illustrating an example case with no clear performance improvement.
Figure 6B:
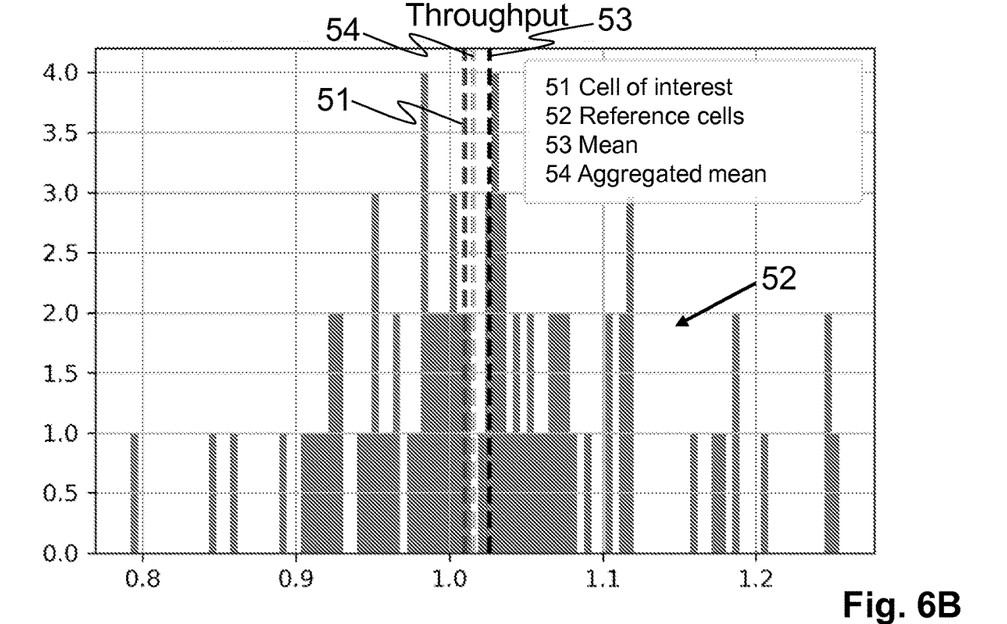
Figure 6C:
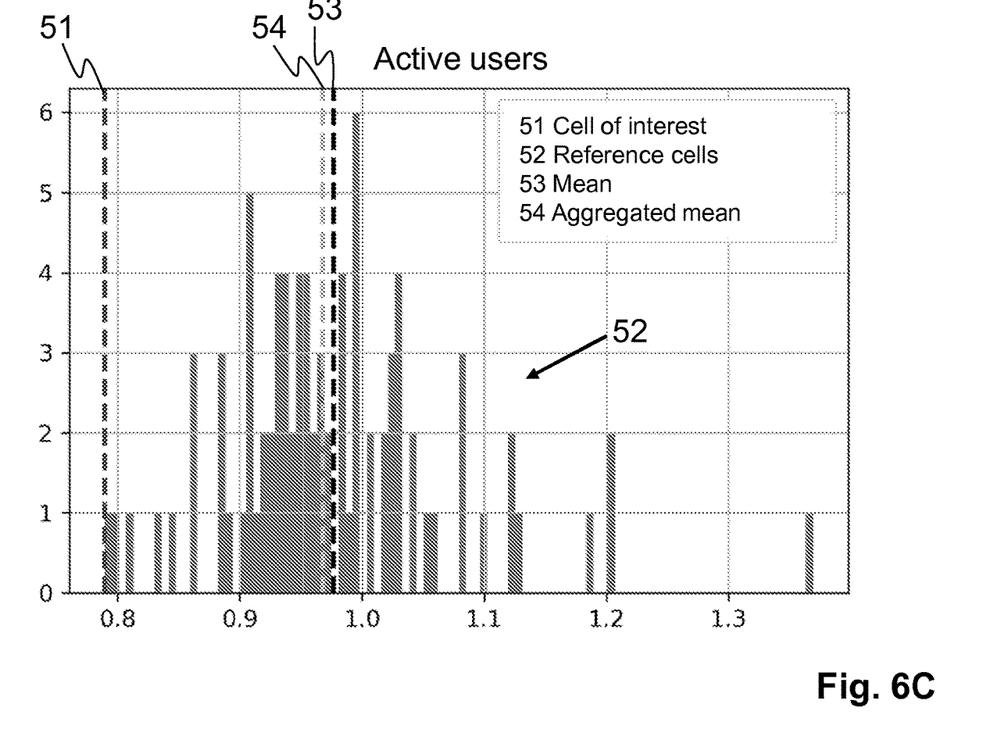

FIGS. 5A-5C show graphs illustrating an example case with performance improvement. FIGS. 6A-6C show graphs illustrating similar example case exhibiting no clear performance improvement. In the examples of cases of FIGS. 5A-6C, antenna of a cell of interest has been downtilted for the purpose of load balancing. The aim is to reduce load in the cell of interest because of an overload situation, and thereby improve the user experience.

FIG. 5A shows a performance indicator related to data volume, FIG. 5B shows a performance indicator related to throughput, and FIG. 5C shows a performance indicator related to number of active users. Likewise, FIG. 6A shows a performance indicator related to data volume, FIG. 6B shows a performance indicator related to throughput, and FIG. 6C shows a performance indicator related to number of active users.

FIGS. 5A-6C show result of comparison of values of performance indicators before and after the change for a cell of interest 51 (the first comparison result) and in a plurality of reference cells 52 (the second comparison result, seen here as a distribution or histogram of individual reference cell comparison results). Additionally, FIGS. 5A-6C show mean 53, which is mean of separate comparison results of individual reference cells, and an aggregated mean 54, which is a comparison result 54 calculated based on an aggregated mean of performance indicators of the plurality of cells. Aggregated mean 54 may be calculated as defined in phases 404 and 405 of FIG. 4. In practice, the mean 53 and the aggregated mean 54 exhibit very similar results in the shown examples. The result of comparisons in the examples of FIGS. 5A-6C is given as ratio of the values of the performance indicator after the change to the values of the performance indicator before the change.

Regarding the example of FIGS. 5A-5C, FIG. 5B shows that there is statistically significant improvement in throughput 51 of the cell of interest compared to reference cells 52 and the mean 53 and aggregated mean 54. FIGS. 5A and 5C show that at the same time data volume and number of active users in the cell of interest are reduced. Based on these, it can be concluded that load is successfully balanced as a consequence of antenna downtilt and the user experience is enhanced by improving the user throughput.

In the example of FIGS. 5A-5C, the first comparison result for the performance indicator related to throughput is 1.4 and mean of the second comparison results for the performance indicator related to throughput is 1.36. Based on this an adjusted improvement factor ΔÂ for the performance indicator related to throughput can be defined as 1.4/1.03=1.36.

Regarding the example of FIGS. 6A-6C, FIGS. 6A and 6C show that data volume and number of active users in the cell of interest are reduced. That is, load has been shifted away from the cell of interest. FIG. 6B however shows that there is no noticeable improvement in throughput 51 of the cell of interest compared to reference cells 52 and the mean 53 and aggregated mean 54. Based on these, it can be concluded that load balancing is not successful or at least not completely successful.

Without in any way limiting the scope, interpretation, or application of the appended claims, a technical effect of one or more of the example embodiments disclosed herein is improved or at least an alternative evaluation of effects of a change in a communication network. In particular, the example embodiments suit well for evaluating effect of a change when time period for monitoring values of performance indicators is limited. By introducing comparison to performance in reference cells, effects of seasonality and trends can be mitigated as both the cell of interest and the reference cells experience same effects of seasonality and trends.

Another technical effect of one or more of the example embodiments is that the evaluation method can be applied to various different KPIs. Different network experts often tend to look at different KPIs when evaluating effects. As the solutions of the various embodiments are equally applicable irrespective of the KPI that is looked at, different experts can easily use the same evaluation method.

Another technical effect of one or more of the example embodiments is a new way to provide numerical value for the amount of improvement achieved by making a change.

If desired, the different functions discussed herein may be performed in a different order and/or concurrently with each other. Furthermore, if desired, one or more of the before-described functions may be optional or may be combined Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the aspects of the disclosed embodiments. It is however clear to a person skilled in the art that the aspects of the disclosed embodiments are not restricted to details of the embodiments presented in the foregoing, but that it can be implemented in other embodiments using equivalent means or in different combinations of embodiments without deviating from the characteristics of the aspects of the disclosed embodiments.

Furthermore, some of the features of the afore-disclosed example embodiments may be used to advantage without the corresponding use of other features. As such, the foregoing description shall be considered as merely illustrative of the principles of the aspects of the disclosed embodiments, and not in limitation thereof. Hence, the scope of the aspects of the disclosed embodiments is only restricted by the appended patent claims.

The invention claimed is:

1. A computer implemented method comprising:
comparing values of a performance indicator before and after a change made in a communication network to evaluate the effect of the change for deciding whether to keep the change or to revert the change by:
comparing values of the performance indicator in a cell of interest before and after the change to obtain a first comparison result;
comparing values of the performance indicator in a set of reference cells before and after the change to obtain a second comparison result; and
evaluating the effect of the change made in the communication network based on a difference between the first comparison result and the second comparison result; the method further comprising:
excluding from the set of reference cells at least one cell that is directly affected by the change made in the communication network, wherein the at least one cell that is excluded is selected based on a distance of the at least one cell to the cell of interest for excluding cells that are near the cell of interest.

2. The method of claim 1, wherein such reference cells are selected that exhibit similar behaviour with the cell of interest but that are not substantially affected by the change made in the communication network.

3. The method of claim 1, wherein the set of reference cells is selected based on one or more of the following: distance to the cell of interest, cell type, and historical behaviour of performance indicators.

4. The method of claim 1, wherein the set of reference cells is selected based on distance to the cell of interest and cell type, or based on distance to the cell of interest, cell type, and historical behaviour of performance indicators.

5. The method of claim 4, wherein the historical behaviour of performance indicators comprises information about correlation of historical behaviour between the cell of interest and the reference cells.

6. The method of claim 1, wherein the first and second comparison results are relative differences in the values of the performance indicator.

7. The method of claim 1, wherein the evaluation of the effect of the change made in the communication network is performed by subtracting the second comparison result from the first comparison result or by dividing the first comparison result by the second comparison result.

8. The method of claim 1, wherein the second comparison result comprises a distribution of individual cell comparisons and the evaluation of the effect of the change made in the communication network is performed based on comparing the first comparison result to the distribution of individual cell comparisons.

9. The method of claim 8, wherein the evaluation of the effect of the change made in the communication network depends on the percentile of values to which the first comparison result belongs in the distribution of individual cell comparisons.

10. The method of claim 1, further comprising comparing values of more than one performance indicator; and
performing the evaluation of the effect of the change made in the communication network based on comparison results obtained by comparing values of more than one performance indicator.

11. The method of claim 1, wherein the change made in the communication network is a network parameter change in the cell of interest or in a sector of interest or in a base station site of interest.

12. The method of claim 1, wherein the change made in the communication network is related to one or more of power save, performance optimization, increasing capacity, load balancing and solving a performance problem.

13. The method of claim 1, further comprising, responsive to the result of the evaluation of the change made in the communication network, keeping the change or reverting the change.

14. An apparatus comprising:
a processor, and
a memory including computer program code; the memory and the computer program code configured to, with the processor, cause the apparatus to perform
comparing values of a performance indicator before and after a change made in a communication network to evaluate the effect of the change for deciding whether to keep the change or to revert the change by:
comparing values of the performance indicator in a cell of interest before and after the change to obtain a first comparison result;
comparing values of the performance indicator in a set of reference cells before and after the change to obtain a second comparison result; and
evaluating the effect of the change made in the communication network based on difference between the first comparison result and the second comparison result; the method further comprising:
excluding from the set of reference cells at least one cell that is directly affected by the change made in the communication network, wherein the at least one cell that is excluded is selected based on a distance of the at least one cell to the cell of interest for excluding cells that are near the cell of interest.

15. A computer program comprising computer executable program code stored on a non-transitory computer readable medium, which when executed by a processor, causes an apparatus to perform:
comparing values of a performance indicator before and after a change made in a communication network to evaluate the effect of the change for deciding whether to keep the change or to revert the change by
comparing values of the performance indicator in a cell of interest before and after the change to obtain a first comparison result;
comparing values of the performance indicator in a set of reference cells before and after the change to obtain a second comparison result; and
evaluating the effect of the change made in the communication network based on difference between the first comparison result and the second comparison result; the method further comprising:

excluding from the set of reference cells at least one cell that is directly affected by the change made in the communication network, wherein the at least one cell that is excluded is selected based on a distance of the at least one cell to the cell of interest for excluding cells that are near the cell of interest.

* * * * *